Sept. 21, 1954    R. D. PHARES    2,689,484
SPEED CHANGE PULLEY BRACKET SUPPORT
Filed June 17, 1952    2 Sheets-Sheet 1

INVENTOR.
Robert D. Phares
BY Scott L. Norvied
atty

Sept. 21, 1954   R. D. PHARES   2,689,484
SPEED CHANGE PULLEY BRACKET SUPPORT
Filed June 17, 1952   2 Sheets-Sheet 2
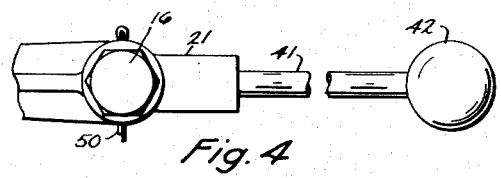
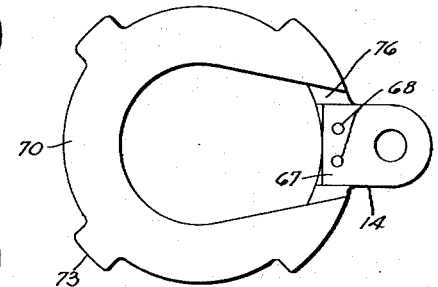
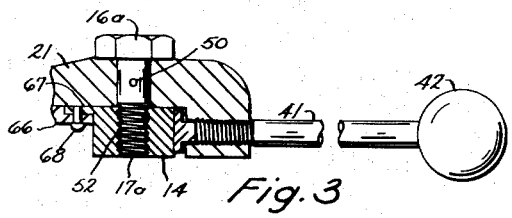
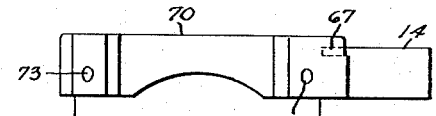
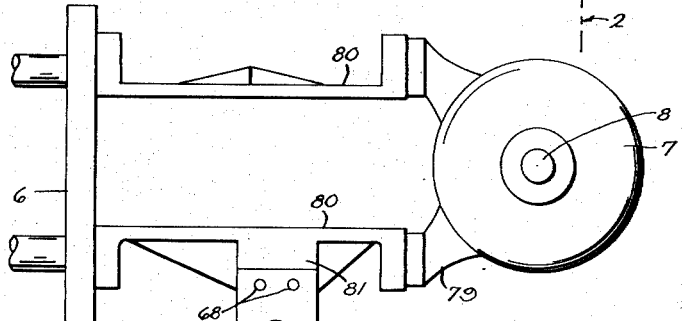
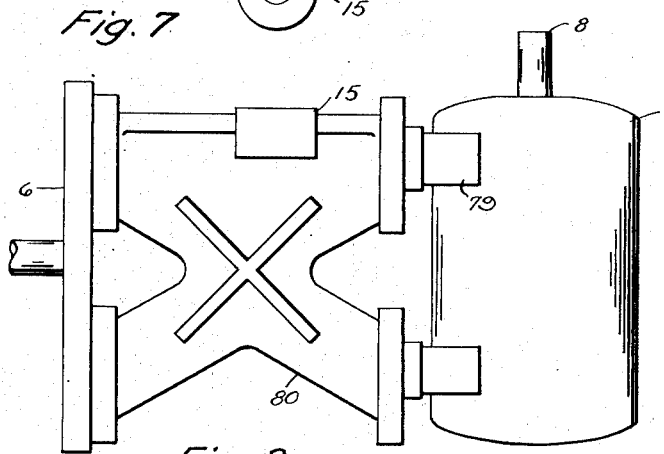
INVENTOR.
Robert D. Phares
BY Scott L. Norvell
atty.

Patented Sept. 21, 1954

2,689,484

UNITED STATES PATENT OFFICE 2,689,484

SPEED CHANGE PULLEY BRACKET SUPPORT

Robert D. Phares, Phoenix, Ariz.

Application June 17, 1952, Serial No. 294,018

6 Claims. (Cl. 74—230.17)

This invention pertains to speed change pulley bracket supports for drill presses having frames with vertical columns supporting a drill head frame which has a vertical spindle positioned within its fore end on the fore side of the column, and a motor having a vertical shaft positioned on the opposite or aft side of the column.

This application is a continuation in part of my previous application designated Serial Number 161,301, filed May 11, 1950, now abandoned.

Drill presses of this type have heretofore been equipped with cone differential V-belt pulleys on the upper ends of the spindle and motor shaft, and speed changes were obtained by shifting the belt. Later it was recognized that the cone pulleys did not give a sufficient range of speed variation, and differential changes of various types were tried. In mounting these differential type speed change pulleys a bracket was provided which pivoted on a bearing, having an axis substantially in alignment with the axis of the vertical column. It has been found that the arcuate travel of the speed change pulley mounted on such a bracket caused the belts used in connection with the differential speed change pulleys to be too tight in some positions and too loose in others. Furthermore, there was no provision made for vertical adjustment of the belts to accommodate the vertical change of position which took place when the shiftable central portion of the speed change pulley moved vertically on its supporting shaft.

In view of the foregoing one of the objects of this invention is to provide a simple cheaply made bracket for mounting a shiftable speed change pulley assembly, of the type having two pulley cones between which a shiftable pulley part moves vertically, on or above the column of a drill press of the type described, so that its travel will be substantially in a straight line between the axis of the spindle shaft and motor shaft.

A second object is to provide a simple and cheap bracket for shiftable speed change pulleys, of the type mentioned, which when mounted on and over the drill press frame column will not only move the speed change pulley assembly in a substantially straight line between the spindle shaft and the driving motor shaft, but will also adjust the shaft on which the speed change pulley assembly is mounted in a vertical direction to compensate for the shifting of the positions of the effective grooves which carry the motor and spindle belts as they change their positions throughout the speed change movement.

A third object is to provide a bracket of the type mentioned having a pivot bearing plate part supported by an adapter on the drill press frame; said adapter being removably secured to said plate so that different adapters may be used to attach to different types of drill press frames or columns.

I attain the foregoing objects by means of the devices, construction and combination of parts illustrated in the accompanying drawings, in which—

Figure 3 is a similar sectional view of a fragmentary portion of a modified form of bracket and bracket support;

Figure 4 is a plan view thereof;

Figure 5 is a plan view of a modified form of drill press bracket support attaching clamp;

Figure 6 is a side, elevational view thereof;

Figure 7 is a plan view of a further modified form of drill press bracket support and attaching adapter;

Figure 8 is a side elevation thereof; and

Similar numerals refer to similar parts in the several views.

Figure 1:
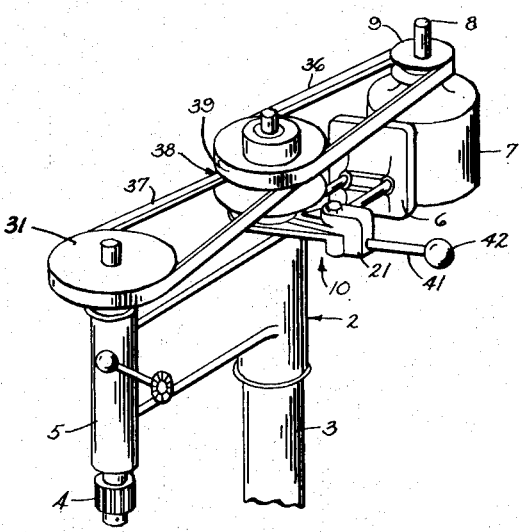
Figure 1 is a perspective view of a drill press of the type here concerned to which one of the improved types of brackets and supports is secured.

Referring to the drawings, 2 indicates the drill press head generally. This is supported on a vertical column 3. The drill press head has a bearing part 5 at the forward part of head 2 which journals the drill press spindle assembly 4. The head 2 is provided with an extensible rear portion 6 on which the driving motor 7 is mounted so that its shaft 8 extends vertically, and carries a driving pulley 9.

The bracket and support, which is the subject of my improvement, is indicated generally by numeral 10 and consists of an attaching adapter 12 which supports the pivot bearing plate 14 in a manner such that the pivot boss 15 is offset eccentrically relative to the axis of column 3. It should be understood that the axis of cylindrical boss 15 is eccentrically disposed relative to the axis of the column 3.

A threaded pivot shaft or pin 16 is screwed vertically and axially into the center of boss 15. Boss 15 is drilled and tapped to receive the lower threaded portion 17 of shaft 16. A pulley shaft bracket 21 is pivoted on shaft 16 and proportioned so that its inner end 18 is disposed over the central opening of the upper end of column 3. This inner end is provided with a boss 20 into which the speed change pulley supporting shaft 22 is affixed.

The speed change pulley assembly is indicated generally by numeral 24. This assembly consists of an upper V belt pulley part 25, a lower V belt pulley part 26, and a double-faced V belt pulley part 27 which is axially shiftable between these two pulley parts to provide an upper effective groove 30 and a lower effective groove 32.

Figure 2:
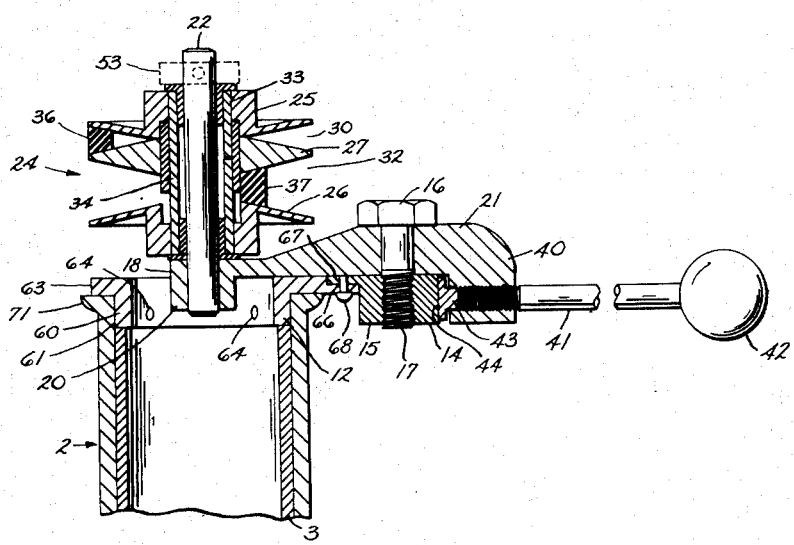
Figure 2 is a cross-sectional view of a speed change pulley bracket as mounted on a support on a drill press column, drawn on a somewhat larger scale.

Pulley parts 25 and 26 are pressed onto a bearing sleeve 33, which is journalled on shaft 22. Shiftable pulley part 27 slides axially on the central portion 34 of this sleeve, and is also journalled on this central portion. A whole assembly 24 is therefore free to turn on shaft 22 and, as shown in Figure 2, is permitted to slide axially upward on this shaft slightly to accommodate and adjust itself to the horizontal running plane of the belts 36 and 37 (Figure 1). As shown in this figure, the driving belt 36 extends from motor shaft pulley 9 to the upper effective groove 30 of pulley assembly 24, while the driven belt 37 extends from the lower effective groove 32 of said assembly to the spindle pulley 31. It is to be noted that in this position the rear bend 38 of driven belt 37 is crowded toward the hub or central portion of pulley assembly 24, and is at the bottom of groove 32, thereby pushing shiftable pulley part 27 upward and crowding the forward bend 39 of driving belt 36 outward toward the rim of the upper effective groove 30. In this position bracket 21 is pivoted so that its inner end carrying boss 20 and shaft 22 is at the forward end of its travel.

At the outer portion of bracket 21 there is a lug 40, which extends downward over boss 15 and is bored radially relative to shaft 16 and is tapped to receive the inner threaded end of operating handle 41. This handle has a ball 42 at its outer end and bears against shoe 43 at its inner end. This shoe acts as a brake and bears against the outer curved surface 44 of boss 15.

Figure 9:
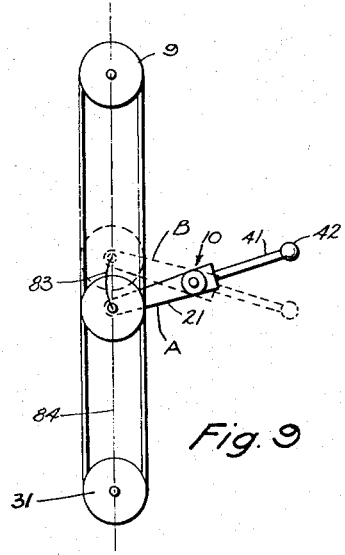
Figure 9 is a semi-diagrammatic plan view of a drill press equipped with my improved form of bracket support showing operating movements thereof.

The position of the bracket indicated in Figure 1 may be known as the low-speed position and this position is indicated in solid lines Figure 9 by letter A. By moving handle 41 forward, the inner end 18 of bracket 21 will be moved rearwardly to the position indicated by dotted lines B in Figure 9. This is known as the low-speed position. Bracket 21 may be held in either of these two positions, or any position intermediate them, by screwing handle 41 inwardly so that shoe 43 frictionally engages the surfaces 44 of boss 15.

As the bracket 21 is moved from position A to position B it will be noted that since upper pulley part 25 is axially fixed on sleeve 33 the shiftable pulley part 27 shifts axially downwardly approximately half the width of belt 36. This belt will tend to be misaligned horizontally in a downward direction. This would ordinarily cause uneven wear on pulley 9. To offset this misalignment the whole pulley assembly 25 slides upwardly, slightly, on shaft 22. Meanwhile, as belt 37 shifts outwardly toward the rim of effective groove 32 it tends to shift downwardly, approximately half the width of the belt. The upward movement of assembly 24 therefore also offsets this shifting movement of belt 37 so that it continues to operate in a horizontal plane and is not misaligned relative to pulley 31.

This manner of shifting pulley assembly 24 is satisfactory as long as the assembly is light relative to the strength and weight of belts 36 and 37. If, however, this assembly is of greater weight, the arrangement is inefficient.

In order to provide definite mechanical adjustment for the vertical position of the assembly 24 relative to the horizontal operating planes of belts 36 and 37, I provide the modification shown in Figures 3 and 4. Here, instead of bracket 21 journalling on the upper portion of shaft 16 it is fixed to the shaft by pin 50. The shaft here designated 16a, turns in boss 15. The threaded portion 17a of this shaft may be said to journal in the threaded hole of the boss. Therefore as bracket 21 is swung relative to the plate 14 it is raised and lowered according to the pitch of threads 52 on shaft 16a. Since it is desired to shift the assembly upward as the bracket moves from position A to position B the threads 52 can be pitched so that they will carry the bracket upward the desired distance. Conversely, the bracket 21 will be lowered when moved from position "B" to "A." Sleeve 33 of assembly 24 is then secured against axial movement on shaft 22 by collar 53 indicated in dotted lines, Figure 1.

As shown in Figure 2, the attaching adapter 12 is fitted into the opening in drill press head 2 through which column 3 extends. This adapter has a boss 60 which fits into the opening 61 in the head. A flange 63 is provided on the upper side of this boss. The boss may then be held in place by set screws 64 which screw radially outward through boss 60 and engage the inner surface of hole 61 in a head 2.

Adapter 12 is provided with a horizontal flange extension 66 on one side which mates with a flange extension 67 on plate 14 and is secured thereto by screws 68.

Where the heads, or head castings of drill frames, are not provided with a bore such as shown at 61, Figure 2, an adapter such as shown in Figures 5 and 6 may be used. This adapter 70 fits over the top flange or rim 71 of the head 2 and is held on it by set screws extending radially thru threaded holes 73. This adapter has a flattened flange 76 which is shaped to receive flange 67 of plate 14. The plate is then held in position by screws 68 similar to those shown in Figure 2.

Where the drill press column will not accommodate either the form of adapter shown in Figure 2 or Figures 5 and 6, an adapter is provided which substantially becomes a part of the drill press head as shown in Figures 7 and 8. This adapter consists of two spreader pieces 80 bolted to head part 6 at the front and to the base 79 of motor 7 at the rear. A flat flange 81 is shaped to receive flange 67 of plate 14 and secured by screws 68 which are similar to those shown in Figure 2.

In the forms shown in Figures 5 and 6, and 7 and 8, the shaft 16 is attached to the plate 14 in the same manner as is shown in Figure 2, and bracket 21 operates in the same manner as above described.

In use, all forms of the bracket are pivoted to turn or swing on or with shaft 16, which is positioned eccentric relative to column 3, to move the speed change pulley assembly across the central portion or axis of this column in a shallow arc 83, Figure 9. The depth of this arc is controlled by the eccentric position of the axis of shaft 16 relative to the axis of column 3. Since the axis of column 3 is intermediate the axis of spindle 4 and that of motor shaft 8, and is in alined position between them, the arc 83 is also substantially alined between the spindle and motor shaft. The arcuate movement transversely of line 84 can be made very small by supporting bracket shaft 16 only a few inches transversely from line 84. For the purposes of moving the pulley assembly fore and aft to secure the shifting of the pulley parts necessary to effect the speed changes desired the movement may be said to be substantially in a straight line relative to the alinement between the spindle and motor shafts, as indicated by line 84. The arcuate travel is usually two inches or less, and an offset of four to six inches gives an adequately shallow arc. The adapters, shown, and the plate removably attached to them provide a convenient means for supporting shafts 16 or 16a in the desired eccentrically offset position. In all cases the adapter is clampably attached to the drill press column or head and is made to provide a flange 63 which forms a support to which a similar mating part on plate 14 is removably attached.

There are a large number of drill presses, of the type mentioned and here concerned, now on the market. They are quite similar in all respects, generally, but differ in minor details. To provide means for securing plate 14 in the proper position on the drill press frame or head, the various adapters are shown. They have the common features that they are screwed to or clampably affixed to a desired part of the drill press frame, and removably secured to the plate by machine screws or their equivalents.

As a whole, the devices here shown provide a convenient and efficient means for supporting speed change pulleys in an operative position on drill presses of the type above indicated, and provide a means for operating them to attain speed changes desired.

While the parts shown here are preferred forms, it is to be understood that various modifications may be made which could be properly considered as mechanical equivalents of the several parts shown and described.

I claim:

1. A speed change pulley bracket support, for a drill press having a vertical frame column supporting a frame head having a vertical spindle at its fore end and a vertical motor shaft at its rear end, to carry a speed change pulley assembly fore and aft between said spindle shaft and motor shaft in a substantially straight line, consisting of an adapter clampably attached to said drill press frame, a pivot bearing plate removably attached thereto, having a cylindrical boss with a vertically extended threaded hole therein, a bracket shaft threaded therein, a speed change pulley bracket journalled on said shaft having an inner end extending substantially over said drill press column and a downwardly extending outer end having a threaded radial hole, a vertically extending speed change pulley shaft attached to the inner end of said bracket and extending upward therefrom, a speed change V belt pulley assembly, having an axially shiftable double faced pulley part between upper and lower pulley halves journalled on said pulley shaft, a handle having an inner end with a thread formed thereon, and an outer end with a gripping knob thereon, having its inner end screwed into said radial hole in the outer portion of said bracket, and a shoe bearing on the inner end of said handle engaging the outer curved surface of said cylindrical boss on said pivot bearing plate.

2. In a drill press having a head supported by a tubular vertical column and having a vertical spindle shaft journalled in the portion forward of said column, and a motor with a vertical shaft on the rear portion of said head, a speed change pulley bracket support to carry a V belt speed change pulley assembly fore and aft between said spindle shaft and motor shaft in a shallow arc, consisting of an adapter having a boss clampably secured on said drill press column and having a laterally disposed plate flange; a pivot bearing plate having a flange on its inner end mating with said plate flange on said adapter and removably secured thereto, and a downwardly extending cylindrical boss on said bearing plate at its outer end axially bored and tapped and having a bracket bearing shaft screwed into the bore of said boss; a speed change pulley bracket journalled on said shaft having an inner end extending over the mid portion of said drill press column, said inner end of said bracket being movable in a shallow arc substantially alined between said spindle shaft and motor shaft; a vertically extending speed change pulley shaft secured to the said inner end of said bracket; said bracket having a lug on the outer end thereof extending outward and downward adjacent the curved outer face of the boss on said bearing plate, provided with a tapped hole extending radially relative to said bearing boss; a speed change V belt pulley assembly journalled on said pulley shaft on said bracket having effective grooves to receive a driving belt and a driven belt; a handle having an outer and an inner end a gripping knob on its outer end and a threaded portion at its inner end screwed into said radial hole in the outer end of said bracket; and a brake shoe bearing against the inner end of said handle frictionally engaging the curved outer surface of said boss on said plate.

3. In a drill press having a head supported by a tubular vertical column and having a vertical spindle shaft journalled in said head forward of said column and a motor with a vertical shaft on the rear portion thereof, a speed change pulley bracket support to carry a V belt speed change pulley assembly fore and aft between said spindle shaft and motor shaft in a shallow arc, consisting of an adapter having a boss clampably secured on said drill press column and having a laterally disposed plate flange; a pivot bearing plate having an inner end and an outer end, a flange on its inner end mating with said flange on said adapter and removably secured thereto, a depending cylindrical boss on the outer end of said plate axially bored and tapped, a bracket holding shaft having a threaded lower portion screwed into the axially threaded bore of the boss on said pivot bearing plate and journalling therein to attain axial movement when rotated; a speed change pulley bracket pinned to said bracket holding shaft having an inner end extending over the mid portion of said drill press column and movable in a shallow arc, generated by rotary movement of said bracket holding shaft, and substantially alined between said spindle shaft and motor shaft on said drill press head; said bracket having an outwardly and downwardly extending lug at its outer end disposed adjacent the outer surface of the cylindrical boss on said plate provided with a tapped hole extending radially relative to said cylindrical boss; a vertical speed change pulley shaft attached to and extending upward from the inner end of said bracket; a speed change V belt pulley assembly journalled on said pulley shaft on said bracket having effective grooves to receive a driving belt and a driven belt; a handle having a gripping knob on its outer end and threaded at its inner end into said radial hole in the outer end of said bracket; and a brake shoe bearing against the inner end of said handle frictionally engaging the curved outer surface of said boss on said plate; the threads on the lower portion of said bracket holding shaft having a pitch sufficient to raise and lower said bracket and said speed change pulley assembly thereon, throughout speed changing movement, so that the horizontal planes of the effective grooves of said V belt speed change pulley assembly are not altered during said speed change movement of said bracket.

4. In a drill press having a frame including a head supported by a tubular vertical column and having a vertical spindle shaft at the fore side of said column and a vertical driving shaft on the aft side of said column, a speed change pulley bracket and bracket support consisting of a pivot bearing plate having an inner portion and an outer portion a vertically extending cylindrical boss positioned on the outer portion of said plate, attaching means for securing said plate to the upper part of the frame of a drill press so that the axis of said boss is offset eccentrically relative to said frame column; a bracket bearing shaft extending axially from said cylindrical boss; a speed change pulley bracket composed of an elongated body having a pivot bearing shaft receiving hole in its central portion, an upwardly extending speed change pulley shaft at one end and an outwardly and downwardly extending lug at its other end having a threaded bore to receive an operating handle extending radially relative to the axis of said pivot bearing shaft; a handle rod having a threaded portion at one end screwable into the bore in said lug, a shoe bearing on the threaded end portion of said handle rod and frictionally engaging the outer curved surface of said cylindrical boss and a gripping knob on its opposite end; and a V belt speed change pulley assembly of type having a double faced pulley part axially shiftable between two pulley parts, having their faces adjacent the respective faces of said shiftable pulley part, to form upper and lower effective V belt grooves journalled on the speed change pulley shaft on said bracket; said bracket being journalled on said pivot bearing shaft to pivot thereon when moved by said handle and to swing said speed change pulley assembly in a shallow arc substantially alined between said driving shaft and said spindle shaft.

5. In a drill press having a frame including a head supported by a tubular vertical column and having a vertical spindle shaft at the fore side of said column and a vertical driving shaft on the aft side of said column, a speed change pulley bracket and bracket support consisting of a pivot bearing plate having an inner portion and an outer portion, a vertically extending cylindrical boss positioned on the outer portion of said plate, attaching means for securing said plate to the upper part of the frame of a drill press so that the axis of said boss is offset eccentrically relative to said frame column; a bracket pivot bearing shaft threaded axially into said cylindrical boss; a speed change pulley bracket centrally attached to said pivot bearing shaft, composed of an elongated body having an inner end and an outer end, an upwardly extending speed change pulley shaft at its inner end, and an outwardly and downwardly extending lug at its outer end having a threaded bore to receive an operating handle extending radially relative to the axis of said pivot bearing; a handle having an inner end and an outer end a threaded portion at its inner end screwable into the bore in said lug; a shoe bearing on the inner end of said handle and frictionally engaging the outer curved surface of said cylindrical boss and a gripping knob on the outer end of said handle; and a V belt speed change pulley assembly of type having a double faced pulley part axially shiftable between two pulley parts having their faces adjacent the respective faces of said shiftable pulley part to form upper and lower effective V belt grooves journalled on the speed change pulley shaft on said bracket; said bracket being affixed to said pivot bearing shaft to turn therewith, and said pivot bearing shaft having its lower portion threaded axially into the boss on said support so as to journal on said threads, pivoting said bracket so that said pulley assembly is swung in a shallow arc substantially alined between said spindle shaft and motor shaft, and is raised and lowered throughout said swinging motion so that the middle of the effective grooves of said pulley assembly remain in the same horizontal plane throughout said movement.

6. In a drill press having a head supported by a tubular vertical column and having a vertical spindle shaft journalled in the portion thereof forward of said column, and a motor with a vertical shaft on the rear portion thereof, a speed change pulley bracket support to carry a V belt speed change pulley assembly fore and aft between said spindle shaft and motor shaft in a shallow arc, consisting of an adapter having a boss clampably secured on said drill press column and having a laterally disposed plate flange; a bearing plate having an inner end and an outer end, a flange on its inner end mating said plate flange on said adapter and removably secured thereto, and a vertically extending cylindrical boss at the outer end of said bearing plate, axially bored and tapped; a bracket bearing shaft screwed into the bore in said boss on said plate; a speed change pulley bracket journalled on said bracket shaft having an inner end and an outer end; a vertical speed change pulley shaft on said inner end of said pulley bracket, disposed over the mid-portion of said drill press column and movable in a shallow arc between said drill spindle shaft and said motor shaft; a lug on the outer end of said pulley bracket extending outwardly and downwardly, adjacent said boss on said bearing plate having a tapped horizontal hole extending radially relative to said cylindrical boss; a speed change V belt pulley assembly, journalled on said pulley shaft, having effective grooves to receive a driving belt and a driven belt; a handle having an outer end and an inner end a threaded portion on its said inner end, and a knob on its outer end, having said threaded portion screwed into the threaded hole in said bracket lug; and a shoe bearing on the inner end of said handle and frictionally engaging the curved outer surface of said boss on said bearing plate.

References Cited in the file of this patent

UNITED STATES PATENTS

| Number | Name | Date |
|---|---|---|
| 2,073,704 | Mitchell | Mar. 16, 1937 |
| 2,561,545 | Wallace | July 24, 1951 |
| 2,566,579 | Nichols | Sept. 4, 1951 |